Figure 1:
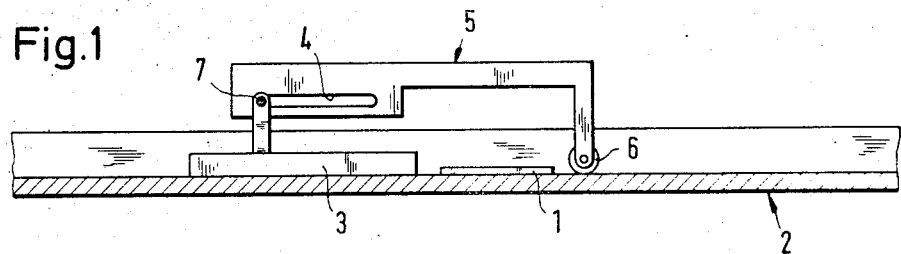

United States Patent [19]

Damm

[11] 3,727,747
[45] Apr. 17, 1973

[54] METHOD AND APPARATUS FOR CONVEYING THE SUBSTRATE OF CIRCUIT SUPPORTS

[75] Inventor: Hans Damm, Iffezheim, Germany

[73] Assignee: Schmall Automation und Elektronik, Baden, Germany

[22] Filed: Dec. 14, 1971

[21] Appl. No.: 207,925

[30] Foreign Application Priority Data

Dec. 14, 1970  Germany ............... P 20 61 466.8

[52] U.S. Cl. .................................. 198/221, 271/54
[51] Int. Cl. ......................... B65g 25/08, B65h 5/04
[58] Field of Search .................. 198/221; 271/54, 271/55, 42, 43, 84

[56] References Cited

UNITED STATES PATENTS 2,154,485   4/1939   Belluche .......................... 271/55

Primary Examiner—Evon C. Blunk
Assistant Examiner—H. S. Lane
Attorney—Cushman, Darby & Cushman

[57] ABSTRACT

A method and an apparatus of conveying the substrate of circuit supports, especially in shallow slide grooves or tracks open at the upper side thereof, by means of a slide, said slide first moving the substrate beneath a pressure roller movably positioned above said groove, thereafter jointly moving said substrate and said pressure roll resting on said substrate to the desired locaton within said slide groove, and, upon returning into the original position, moving said pressure roller away from said substrate and into its original position. Said apparatus comprising at least one shallow slide groove or track open at its upper side and serving to receive said substrate, a slide for advancing said substrate and movably positioned within said grooves, and a pressure roller for loading said sliding substrate and being mounted for movement together with said slide.

5 Claims, 4 Drawing Figures

METHOD AND APPARATUS FOR CONVEYING THE SUBSTRATE OF CIRCUIT SUPPORTS

The present invention relates to a method and to an apparatus for conveying the substrate of circuit supports.

In devices for the manufacture of circuit supports, such as e.g., thick-film or thin-film circuits, and especially in automatic balancing devices, one of the major difficulties resides in the rapid and reliable transportation of the ceramic substrate from a storage container, bin or the like to the processing area. Due to the relatively small weight of the ceramic bodies which renders impossible a rapid movement of the bodies over long paths because of the danger of a "lift-off" from the supporting surface and also because of the danger of causing damage to the surface of the substrate, substrates of this type heretofore were conveyed with the aid of devices which were extremely complicated in mechanical respects, such as clamping tools attached to conveyor belts (which again require additional expenditure for feeder or follower tools).

It is an object of the invention to avoid the disadvantages of the prior art, and especially to provide a method and an apparatus for conveying the substrate of thick-film circuits, which method and apparatus may be realized in most simple manner and in consideration of most economical aspects, and which, moreover, by far exceed the operational speed of conventional apparatuses.

By using a slide which displaces the substrate in translatory manner within a slide groove, according to the invention this object is solved primarily by the steps that said slide first moves the substrate beneath a pressure roller movably positioned above said groove, thereafter jointly moves said substrate and said pressure roll resting on said substrate to the desired location within said slide groove, and, upon returning into the original position, moves said pressure roller away from said substrate and in to its original position.

Hereby, both the novel sequence of the method and, generally, the selection of a slide track provided with a slide are essential to the invention because up to now it was considered impossible to use this method which is very simple in mechanical respects, and that especially because — as mentioned above — on the one hand a rapid movement or displacement of the substrate within an open track heretofore was not reflected upon in view of the danger of the "lift-off" and "flying away" of the extremely light body, and because on the other hand a covering of the track was out of the question because of the danger of damage to the surface of the substrate. However, the pressure roller according to the invention solves these problems in most simple manner, whereby the combinatory cooperation of the employed features is of decisive importance, too.

The present invention may be realized in practice particularly by using the features that said pressure roller is mechanically coupled with said slide with such degree of freedom that it remains stationary during a short starting phase of said slide; that the distance which said slide moves during the starting phase serves to advance said substrate beneath said pressure roller; and that during the subsequent main phase of motion the advancing movement of said slide, said substrate and said pressure roller is positively coupled by positive engagement between said components, whereby it is of particular advantage if said degree of freedom of the coupling between said slide and said pressure roller provides for an initial disengagement of said slide and for a subsequent retraction of the pressure roller from said substrate when said apparatus returns into its original position.

A simple apparatus which can be manufactures economically is provided especially also in that said degree of freedom of the coupling between said slide and said pressure roller is provided by a pin being movable within an elongated slot between a first abutment and a second abutment; and that the length of said elongated slot is equal to the distance which separates said substrate in its rest porition from its position beneath said pressure roller.

The present invention is now being explained in greater detail in connection with an exemplary embodiment and by means of the enclosed drawing, wherein:

FIGS. 1 to 4 are schematical views of an apparatus embodying the invention, wherein the apparatus is shown in various phases of movement thereof.

Figure 2:
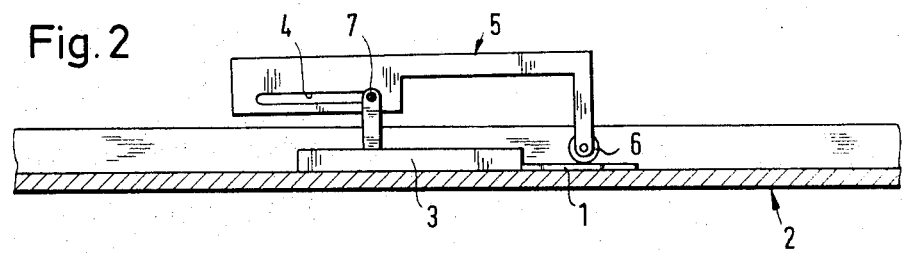

According to FIGS. 1 to 4, a ceramic substrate 1 is positioned within a slide track 2 and is moveable therein by means of a slide 3. The slide is coupled with a pressure roller 6 through a pin 7 slidably received within an elongated slot 4 of a pressure means 5, in such manner that during an initial phase of motion, as illustrated in FIGS. 1 and 2, the substrate 1 is first moved beneath the pressure roller 6, whereas the latter remains in its initial or original position.

Figure 3:
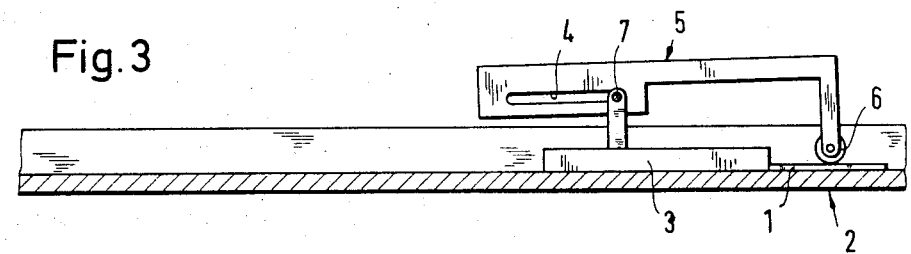

As shown in FIG. 3, the pressure roller 6 which rests on the substrate 1 is then displaced together with the latter by abutment of the pin 7 at the right hand end of the elongated slot.

Figure 4:
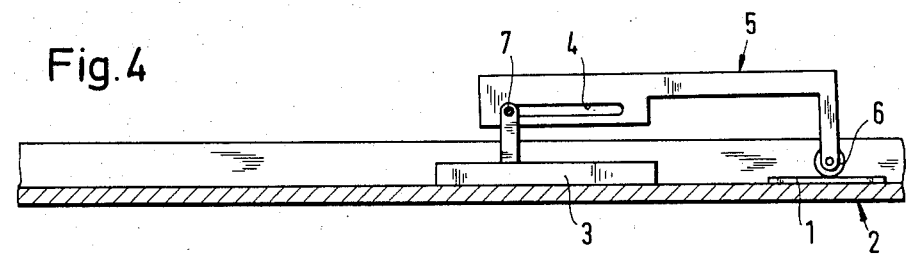

As shown in FIG. 4, the sequence of motion is exactly opposite after the desired position has been reached. First, the slide 3 is disengaged from the substrate so that the latter may be fixed in its position by any desired holding means, while the substrate is still reliably maintained in its position by the pressure roller 6. It is only when the pin 7 upon retraction of the slide 3 abuts the left hand end of the elongated slot 4 again, that the pressure roller 6 is likewise retracted so that it returns into its original position together with the slide 3.

What I claim is:

1. A method of conveying the substrate of circuit supports, especially in shallow slide grooves or tracks open at the upper side thereof, by means of a slide, characterized in that said slide first moves the substrate beneath a pressure roller movably positioned above said groove, thereafter jointly moves said substrate and said pressure roll resting on said substrate to the desired location within said slide groove, and, upon returning into the original position, moves said pressure roller away from said substrate and into its original position.

2. Apparatus, especially for carrying out the method according to claim 1, for conveying the substrate of circuit supports, characterized by at least one shallow slide groove or track open at its upper side and serving to receive said substrate, a slide for advancing said substrate and movably positioned within said grooves, and a pressure roller for loading said sliding substrate and being mounted for movement together with said slide.

3. The apparatus according to claim 2, characterized in that said pressure roller is mechanically coupled with said slide with such degree of freedom that it remains stationary during a short starting phase of said slide; that the distance which said slide moves during the starting phase serves to advance said substrate beneath said pressure roller; and that during the subsequent main phase of motion the advancing movement of said slide, said substrate and said pressure roller is positively coupled by positive engagement between said components.

4. The apparatus according to claim 3, characterized in that said degree of freedom of the coupling between said slide and said pressure roller provides for an initial disengagement of said slide and for a subsequent retraction of the pressure roller from said substrate when said apparatus returns into its original position.

5. The apparatus according to claim 4, characterized in that said degree of freedom of the coupling between said slide and said pressure roller is provided by a pin being movable within an elongated slot between a first abutment and a second abutment; and that the length of said elongated slot is equal to the distance which separates said substrate in its rest position from its position beneath said pressure roller.

* * * * *